(12) United States Patent
Riedel et al.

(10) Patent No.: US 10,780,980 B2
(45) Date of Patent: Sep. 22, 2020

(54) ELECTRONIC BAGGAGE STOWAGE SYSTEM AND METHODS

(71) Applicant: Airbus Operations GmbH, Hamburg (DE)

(72) Inventors: Christian Riedel, Hamburg (DE); Peter Klose, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 453 days.

(21) Appl. No.: 15/704,209

(22) Filed: Sep. 14, 2017

(65) Prior Publication Data

US 2018/0086464 A1    Mar. 29, 2018

(30) Foreign Application Priority Data

Sep. 23, 2016 (DE) .......................... 10 2016 218 307

(51) Int. Cl.
*B64D 11/00* (2006.01)
*G06T 7/70* (2017.01)
(Continued)

(52) U.S. Cl.
CPC ............ *B64D 11/003* (2013.01); *B64F 1/368* (2013.01); *G06K 17/00* (2013.01); *G06T 7/70* (2017.01);
(Continued)

(58) Field of Classification Search
CPC ................... B64D 11/003; G06T 7/70; G06T 2207/30112; B64F 1/368; G06K 17/00; G06K 17/0022
See application file for complete search history.

(56) References Cited

U.S. PATENT DOCUMENTS

2010/0140409 A1   6/2010  Poerner
2013/0290221 A1*  10/2013  Jindel .................... G06Q 10/08
                                                                        705/500
(Continued)

FOREIGN PATENT DOCUMENTS

DE      102008058425      5/2010
WO      2016100610        6/2016
WO      WO-2016100610 A1 * 6/2016 ............. G01S 17/06

OTHER PUBLICATIONS

German Search Report, dated May 22, 2017, priority document.

*Primary Examiner* — Assres H Woldemaryam
(74) *Attorney, Agent, or Firm* — Greer, Burns & Crain, Ltd.

(57) ABSTRACT

An electronic baggage stowage system for an aircraft comprising a first detector to detect free space in a cabin stowage space, wherein the first detector is configured to output cabin stowage space data based on the detection, a processing unit communicating with the first detector, wherein the processing unit is configured to process the cabin stowage space data, receive and process baggage size data indicating the size of one or more baggage items, and output baggage stowage mapping data in response to the processing of the cabin stowage space data and the baggage size data. The baggage stowage mapping data indicates one or more target positions in the cabin stowage space at which the baggage items are to be placed. An indicator communicates with the processing unit to provide the indication of the one or more target positions to a flight attendant or passenger of the aircraft.

18 Claims, 4 Drawing Sheets

(51) Int. Cl.
*B64F 1/36* (2017.01)
*G06K 17/00* (2006.01)

(52) U.S. Cl.
CPC  *G06K 17/0022* (2013.01); *G06T 2207/30112* (2013.01)

(56) References Cited

U.S. PATENT DOCUMENTS

| | | | |
|---|---|---|---|
| 2015/0241209 A1* | 8/2015 | Jouper | G06Q 50/28 |
| | | | 702/156 |
| 2016/0109280 A1* | 4/2016 | Tiu | G01D 7/00 |
| | | | 702/173 |
| 2016/0180289 A1 | 6/2016 | Siris | |
| 2018/0086464 A1* | 3/2018 | Riedel | G06T 7/70 |
| 2018/0173962 A1* | 6/2018 | Ibrahim | B61D 37/003 |
| 2018/0257554 A1* | 9/2018 | Simms | B60Q 3/30 |
| 2018/0257784 A1* | 9/2018 | Simms | B64D 45/00 |
| 2018/0261026 A1* | 9/2018 | Simms | B64D 47/02 |
| 2020/0036935 A1* | 1/2020 | Lee | H04N 21/44218 |

\* cited by examiner

ELECTRONIC BAGGAGE STOWAGE SYSTEM AND METHODS

CROSS-REFERENCES TO RELATED APPLICATIONS

This application claims the benefit of the German patent application No. 10 2016 218 307.9 filed on Sep. 23, 2016, the entire disclosures of which are incorporated herein by way of reference.

FIELD OF THE INVENTION

This invention generally relates to electronic baggage stowage systems and methods allowing, in particular, for an electronically supported optimization of the boarding process by passenger guidance in an aircraft.

BACKGROUND OF THE INVENTION

Passengers, for example of aircraft, may generally have to search a stowage space for their baggage, such as cabin or hand baggage, during boarding of the aircraft cabin. Passengers who are seated in the last few rows may find all overhead bins or compartments occupied when arriving at their seat. In this scenario, the passenger may have to go back against the stream of passengers entering the aircraft to find a free stowage space. This may lead to a jamming of the aisle and slow down the boarding process.

The prior art has thus far mainly focused on detecting lost baggage when surveying stowage space. However, no attempts have been made to date in order to optimize stowing baggage in, for example, cabin stowage spaces of an aircraft, when cabin boarding takes place.

There is therefore a need for optimization of baggage stowing in vehicles, such as aircraft.

SUMMARY OF THE INVENTION

According to a first aspect of the present invention, there is therefore provided an electronic baggage stowage system for an aircraft comprising: a first detector for detecting free space in a cabin stowage space, wherein the first detector is configured to output cabin stowage space data based on the detection; a processing unit in communication with the first detector, wherein the processing unit is configured to: process the cabin stowage space data; receive and process baggage size data indicating the size of one or more baggage items; and output baggage stowage mapping data in response to the processing of the cabin stowage space data and the baggage size data, wherein the baggage stowage mapping data indicates one or more target positions in the cabin stowage space at which the one or more baggage items are to be placed; and an indicator in communication with the processing unit for providing the indication of the one or more target positions to a flight attendant or passenger of the aircraft.

Embodiments described herein may therefore allow, for example, for guidance of passengers to a stowage space which is free at the time of boarding of, e.g., an aircraft, where baggage may be stored. This may ultimately result in passengers being more relaxed during boarding as a "personal" stowage space may be allocated to each passenger.

While processing cabin stowage space data and baggage size data to output baggage stowage mapping data, the electronic baggage stowage system may provide for a faster boarding of passenger as the time for searching for a free compartment for baggage is reduced. The dwell time in, for example, the aisle of an aircraft may thereby be advantageously significantly reduced.

Furthermore, usage of the compartments for storing baggage is optimized as an indication is provided to the passenger or, for example the flight attendant or cabin crew, as to where a free compartment is still available for storing baggage. This may allow for an equal or generally optimized distribution of baggage throughout the entire cabin stowage space available for storing baggage. As the packaging of baggage is improved, the number of baggage items which may be stored in the cabin stowage space may be increased.

In some preferred embodiments, the electronic baggage stowage system is configured to optimize the load distribution in, e.g., the cabin of an aircraft due to the improved baggage distribution. However, the skilled person will appreciate that optimizing baggage distribution according to their size may destructively interfere with attempts to improve load distribution throughout the cabin. Embodiments of the electronic baggage stowage system may therefore be configured to either prioritize an optimization of baggage stowage according to their size or according to their weight. Alternatively, the optimization of baggage stowage according to their size may be prioritized over the optimization according to their weight (or vice versa) by a predetermined weighted ratio.

It is to be noted that the indicator may be a device which directly indicates the one or more target locations to a flight attendant or passenger. This may be in the form of a display device which may be arranged at the corresponding compartments and/or at the cabin crew control panel and/or at the entrance of, e.g., the aircraft. Alternatively or additionally, the indicator may be in the form of an acoustic signal or another signal the passenger or flight attendant may receive. Alternatively or additionally, the indicator may be a device which is configured to send information regarding the one or more target locations to a further device, such as, but not limited to, a display device, an acoustic device, a portable personal device of the passenger or the cabin crew (e.g., a smartphone or tablet), etc.

The first detector may be in the form of, for example, an image recognition device which may be used to, e.g., take an image of a space and subtract the background from the image to determine as to whether the space is occupied by a baggage item or not. Additionally or alternatively, the first detector may be a laser scanner which may be rotatably mounted on, e.g., the ceiling of the cabin, allowing for a three-dimensional image to be obtained from the cabin stowage space. Additionally or alternatively, the first detector may comprise an ultra-sound device with which an ultra-sound image may be obtained to determine the occupancy of a space in the cabin stowage space. It will be understood that other methods readily known to the person skilled in the art may be used in order to obtain information regarding the occupancy of a cabin stowage space.

In a further preferred embodiment of the electronic baggage stowage system, the detection of free space comprises detecting whether a baggage slot in the cabin stowage space is free. This may then be indicated in the form of, for example, a colored light, e.g., a red light indicating that the corresponding, respective slot of the cabin stowage space is occupied and a green light indicating that the corresponding, respective slot is free. Such a simplified indication as to the availability of the slot or space in the compartment may be particularly advantageous as the passenger may be able to easily and expeditiously identify whether a compartment is free or not.

In a further preferred embodiment of the electronic baggage stowage system, the detection of free space comprises measuring an available space volume in the cabin stowage space. This may be particularly advantageous as the packaging of the cabin stowage space may be further improved. Embodiments may therefore allow for indicating, for example, a small space in the cabin stowage space which may be filled up with one or more baggage items which may be small enough to fit the free space, but not with other larger baggage items. Additionally or alternatively, embodiments may allow for indication that a certain free space may preferably be occupied by a larger baggage item. This may in particular advantageously increase the number of baggage items which may be stowed in the cabin stowage space.

In some preferred embodiments of the electronic baggage stowage system, the shape of baggage items may be taken into account in order to determine an optimized distribution of baggage items in the cabin stowage space.

Furthermore, as the stowage distribution may be determined in a more precise manner, the load distribution may be improved further in embodiments in which the available space volume in the cabin stowage space is measured.

In a further preferred embodiment of the electronic baggage stowage system, the detection of free space comprises continuously detecting the free space. This may be particularly preferred as the baggage stowage mapping data may be updated at a faster rate, e.g., in case a baggage item has been placed at the wrong position such that a new distribution may have to be calculated.

It is to be noted that any references throughout the description as to the detection of free space is to be understood as to the detection whether a certain space is occupied by a baggage item or not. The skilled person will immediately understand that detection of free space is not limited to a detection process only in the event that a defined space is free. The detection of free space, as outlined above, involves detecting occupied space.

In further preferred embodiments of the electronic baggage stowage system, the detection of free space may be performed at intervals, i.e., in a non-continuous manner. This may be advantageous as the features of the electronic baggage stowage system may only need to be operated at intervals, thereby saving energy. However, it will be understood that updates to the baggage stowage mapping data may occur at a lower rate compared to the mode in which the detection of free space is provided in a continuous manner. It will be appreciated that the intervals at which free space is detected in the non-continuous mode may however be chosen to be relatively small, e.g., 5 seconds, 2 seconds, 1 second, or less.

In a further preferred embodiment, the electronic baggage stowage system further comprises a first wireless communication link for receiving the baggage size data, wherein the first wireless communication link is in communication with the processing unit to provide the baggage size data to the processing unit. This may be particularly advantageous as the baggage size may be input by, e.g., the passenger or another cabin crew member prior to boarding the cabin. The distribution and hence target location(s) of the one or more baggage items may therefore be determined prior to boarding the cabin. This may allow for providing the information regarding the one or more target locations of the baggage item(s) to the passenger(s) and/or cabin crew prior to boarding. In some embodiments, the target location(s) may be sent to the personal portable device of a passenger and/or it may be displayed on the control panel of the cabin crew. Additionally or alternatively, the target location(s) may be printed on the boarding pass of a passenger such that the information is known to the passenger prior to boarding, resulting in a more relaxed boarding process for passengers.

In a further preferred embodiment, the electronic baggage stowage system further comprises a second detector for detecting the size of the one or more baggage items, wherein the second detector is configured to output the baggage size data, and wherein the processing unit is in communication with the second detector to process the output baggage size data received from the second detector. This may be particularly advantageous as a passenger may not need to provide baggage size data to the system or, in particular and ultimately the processing unit, prior to boarding the plane. The second detector may be arranged at the entrance of, e.g., the aircraft, allowing for enough time for outputting the baggage stowage mapping data, such that the baggage distribution may be provided to the cabin crew and/or passenger in a timely fashion.

The second detector may take various forms, such as, but not limited to, an RFID tag detector, a bar code scanner, a camera, an ultrasound scanner, a laser scanner, and others. Therefore, in some preferred embodiments of the electronic baggage stowage system, the second detector is configured to read a tag identifying a baggage item in order to retrieve the baggage size data from the tag, in particular wherein the tag comprises one or more of: an RFID tag; a bar code; and an optical image.

The skilled person will appreciate that such a tag may be fixed to a baggage item. Additionally or alternatively, a tag may be incorporated in, e.g., the boarding pass of a passenger. As the boarding pass may be hidden, e.g., in a jacket or the like of a passenger entering the cabin, it may be particularly advantageous to use RFID tags in the boarding pass which may be detected with an RFID detector. The skilled person will be familiar with further techniques allowing the identification of a baggage item in order to determine or retrieve information regarding the size of a baggage item.

In a further preferred embodiment of the electronic baggage stowage system, the processing unit is further configured to receive and process seating data indicating a seat number of one or more passengers of the aircraft (or vehicle), wherein the outputting further comprises outputting the baggage stowage mapping data in response to the processing of the seating data. This may be particularly advantageous as baggage items may preferably be allocated a target position which is as close as possible to the passenger seat, allowing for convenient access of the baggage item during the journey or flight. The skilled person will understand that the system may be configured to prioritize an optimized distribution of baggage according to their size. Alternatively, the system may be configured to optimize the distribution according to the distance of a target location to the corresponding, respective passenger seat. Alternatively, a middle-way may be found in which the distribution of baggage according to their size may be, e.g., below a certain threshold of space lost due to the baggage distribution, and at the same time below, e.g., a certain threshold distance between the target location for a baggage item and the corresponding, respective passenger seat.

In a further preferred embodiment of the electronic baggage stowage system, the indicator comprises a second wireless communication link for sending the indication of the one or more target positions to an electronic portable device of a flight attendant or passenger. This may be particularly advantageous as the cabin crew member or passenger may, e.g., continuously be updated on, e.g., any changes to the target location of a respective baggage item.

The skilled person will appreciate that the above-described first wireless communication link and the second wireless communication link may be integral to a single wireless communication link.

In a further preferred embodiment of the electronic baggage stowage system, the indicator comprises a display, in particular an OLED or LCD display, or a beamer for displaying the one or more target positions, in particular in the form of a baggage ID, at a corresponding, respective position of the cabin stowage. This may be particularly advantageous, as a passenger may be able to easily identify a target position at which a baggage item should be placed while already being in the cabin. Additionally, the system may be configured to determine whether a certain passenger has already boarded or not, and if the passenger has not yet boarded the aircraft, the target location for the baggage item of this passenger may still be updated without causing further inconvenience to the passenger while being in the cabin.

In a further preferred embodiment of the electronic baggage stowage system, the indication of a target position comprises indicating a target orientation in which a baggage item is to be placed in the cabin stowage space. This may be particularly advantageous as the distribution of baggage items in the cabin stowage space may be further improved. This may also result in the possibility of stowing a larger number of baggage items in the cabin stowage space. Further still, the weight distribution may alternatively or additionally be improved due to the higher number of possible target locations per baggage item.

In a further preferred embodiment, the electronic baggage stowage system is further configured to update the one or more target positions when a baggage item has been placed in a wrong one of the target positions. The system is thereby configured to dynamically update and output the baggage stowage mapping data. This may be particularly advantageous, as the system may not be able to force a passenger to place a baggage item at a target position identified by the electronic baggage stowage system. Furthermore, a passenger may choose to stow a baggage item in the vicinity of their designated seat, to minimize the distance between the seat and the baggage item. Embodiments therefore allow for updating the system dynamically once a baggage item has been placed (by accident or intentionally) at a wrong, previously determined target position.

In a further preferred embodiment of the electronic baggage stowage system, the indicator is further configured to provide an indication of a free space after a corresponding, respective compartment has been closed. This may be particularly advantageous as it may not be necessary to open a compartment, e.g., once no more free space is available in the compartment. Furthermore, as one or more compartments may be kept closed (e.g., once no more free space is available), a passenger may find their allocated target position for stowing their baggage item at a faster rate as he may concentrate on, e.g., indications regarding their target position merely at compartments which are still open.

According to a related aspect of the present invention, there is provided a method for providing an indication of a target position of a baggage item in a cabin stowage space of an aircraft to a flight attendant and/or passenger, the method comprising: detecting free space in the cabin stowage space and outputting cabin stowage space data based on the detection; receiving baggage size data indicating the size of the baggage item; processing the cabin stowage space data and the baggage size data; outputting baggage stowing mapping data in response to the processing, wherein the baggage stowage mapping data indicates a target position in the cabin stowage space at which the baggage item is to be placed; and providing an indication of the target position to the flight attendant and/or the passenger.

As outlined above, providing the indication as to the target position of a baggage item to a flight attendant or passenger may comprise displaying the target position, e.g., on a display at the corresponding, respective compartment or the control panel of the cabin crew. Additionally or alternatively, providing the indication as to the target position may comprise sending the information regarding the target position to, e.g., a personal portable device of the passenger and/or flight attendant.

The skilled person will immediately understand that preferred embodiments of the electronic baggage stowage system as outlined above may be used to further improve the method for providing an indication of a target position of a baggage item in a cabin stowage space of an aircraft to a flight attendant and/or passenger.

Furthermore, it will be understood that any references to baggage size throughout the description may be equally applicable to baggage weight (including techniques, features of the system and methods to determine or input baggage weight data), or the combination of baggage size and baggage weight, and in some embodiments a weighted ratio of baggage size and baggage weight.

Further still, any references to an aircraft throughout the description may be equally applicable to other means and vehicles of transportation.

The invention further provides processor control code to implement the above-described systems and methods, for example on a general purpose computer system or on a digital signal processor (DSP). The code is provided on a non-transitory physical data carrier such as a disk, CD- or DVD-ROM, programmed memory such as non-volatile memory (e.g., Flash) or read-only memory (Firmware). Code (and/or data) to implement embodiments of the invention may comprise source, object or executable code in a conventional programming language (interpreted or compiled) such as C, or assembly code, or code for a hardware description language. As the skilled person will appreciate such code and/or data may be distributed between a plurality of coupled components in communication with one another.

BRIEF DESCRIPTION OF THE DRAWINGS

These and other aspects of the invention will now be further described, by way of example only, with reference to the accompanying figures, wherein like reference numerals refer to like parts, and in which.

DETAILED DESCRIPTION OF THE PREFERRED EMBODIMENTS

In this example, a surveillance mechanism for the cabin baggage stowage space in an aircraft is outlined.

Figure 1:
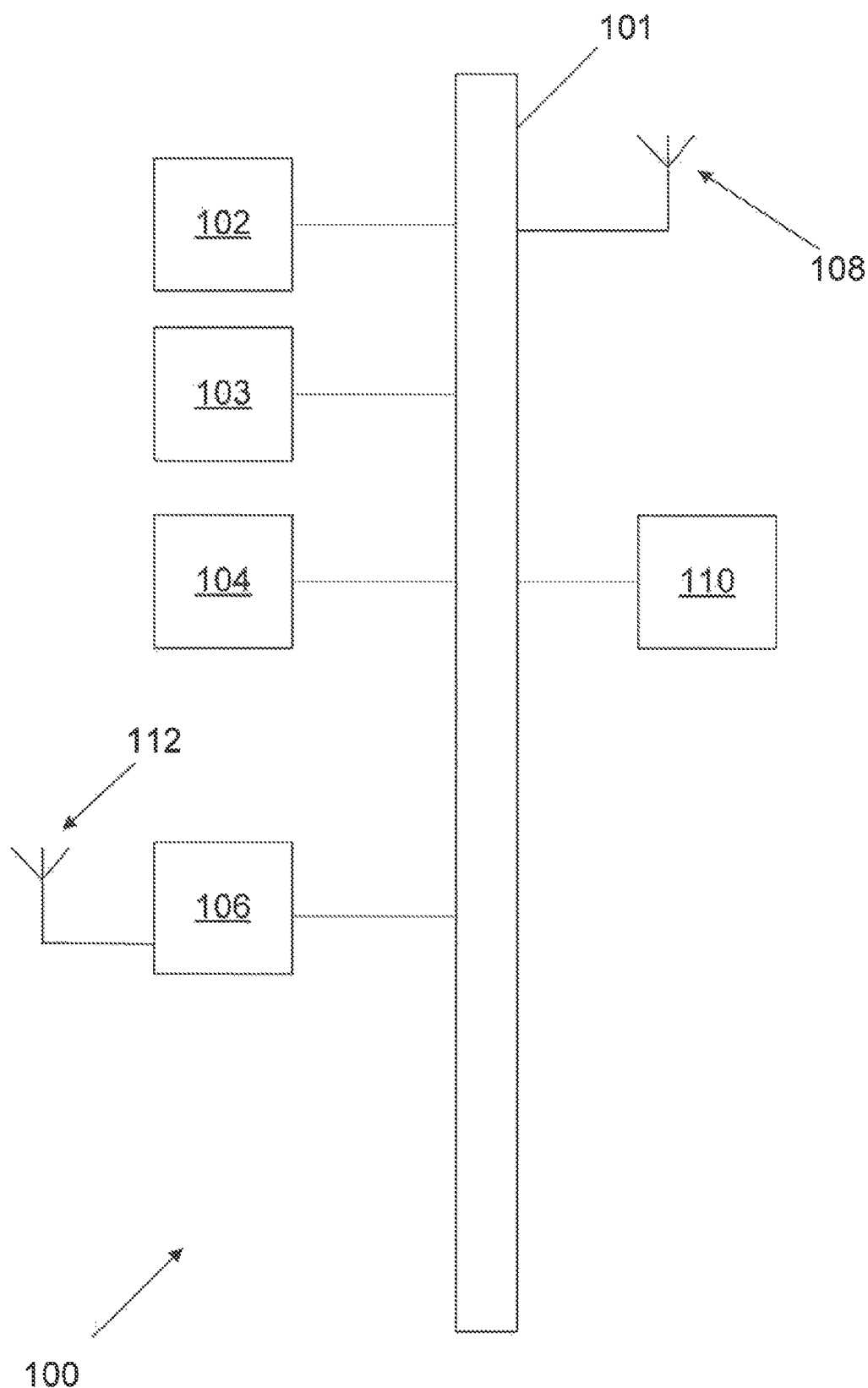
FIG. 1 shows a schematic block diagram of an electronic baggage stowage system according to embodiments of the present invention.

FIG. 1 shows a schematic block diagram of an electronic baggage stowage system 100 according to embodiments as described herein.

In this example, the electronic baggage stowage system 100 comprises a detector 102. The surveillance mechanism is realized in here by a video camera, ultrasonic sensors or laser scanners. Free space is measured in this example by detector 102 and the available volume of the free space is determined. The detection of free space using detector 102 is performed continuously during the boarding process. The information is then available on-board the aircraft and can be provided to the processing unit 104 with which detector 102 is in communication via an electronic connection 101. As outlined above, the component of the electronic baggage stowage system may also communicate with each other wirelessly.

In this example, the electronic baggage stowage system 100 comprises a memory 103 on which cabin stowage space data, baggage size data and baggage stowage mapping data is stored.

In this example, an indicator 106 is provided which is in communication with the processing unit 104 via the electronic connection 101. The indicator 106 is in this example connected to a wireless communication link 112, with which the indication of the target position of a baggage item in the cabin stowage space is communicated to a portable mobile device of a flight passenger.

In this example, the electronic baggage stowage system 100 further comprises a further wireless communication link 108 which is used to receive baggage size data from the passenger or cabin crew staff prior to boarding of the aircraft. The passenger enters, in this example, the baggage size of the baggage item into the booking system prior to boarding the aircraft. The wireless communication link 108 is in communication with the processing unit 104 at which the baggage size data is processed. Furthermore, baggage size data received at the wireless communication link 108 is additionally stored in the memory 103.

The electronic baggage stowage system 100 comprises, in this example, a second detector 110 which is used to detect the size of baggage items when the passengers enter the cabin of the aircraft. Baggage size data obtained via the detector 110 is then forwarded to the processing unit 104 with which the second detector 110 is in communication with via the electronic connection 101.

Figure 2:
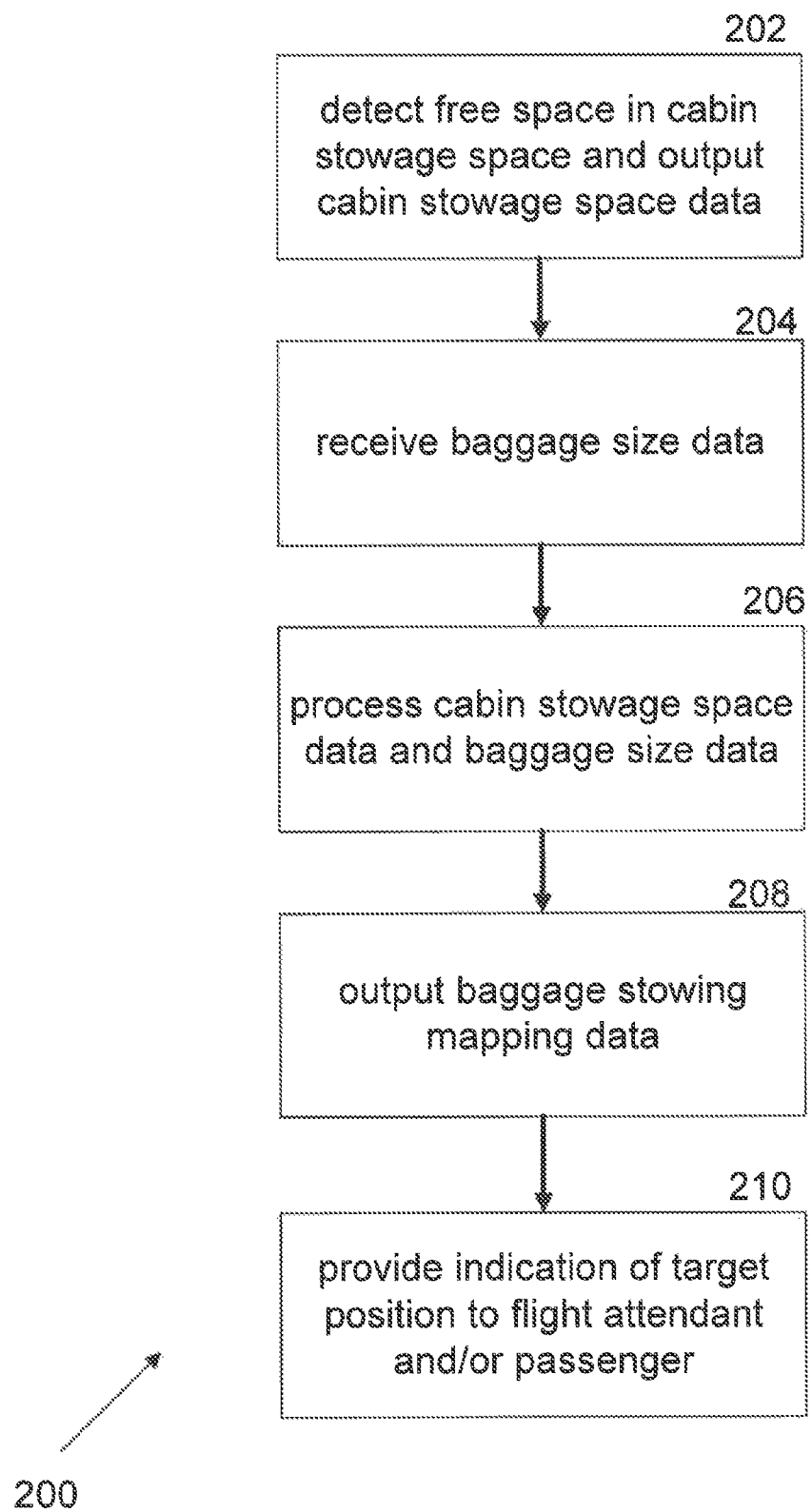
FIG. 2 shows a flow chart of a method for providing an indication of target stowage position of a baggage item to a passenger according to embodiments of the present invention.

FIG. 2 shows a flow chart 200 of a method for providing an indication of target stowage position of a baggage item to a passenger according to embodiments described herein.

At step 202, free space is detected in a cabin stowage space and cabin stowage space data is output based on the detection.

At step 204, baggage size data is received which indicates the size of one or more baggage items.

The skilled person will immediately understand that the steps 202 and 204 may be performed one after the other (the order of which may vary) or simultaneously.

At step 206, the cabin stowage space data and the baggage size data are processed, in this example, using the processing unit 104.

At step 208, baggage stowing mapping data is then output in response to the processing of the cabin stowage space data and the baggage size data. The baggage stowing mapping data indicated a target position (or more target positions) in the cabin stowage space of the aircraft at which the baggage item is to be placed.

At step 210, the indication of the target position is then provided to the flight attendant and/or passenger.

The passenger is hereby guided, in this example, to the best free stowage space regarding his seating position by continuous monitoring of free space in the stowage compartments. The electronic baggage stowage system calculates the optimal stowage distribution and indicates this to the passenger and cabin crew.

Figure 3:
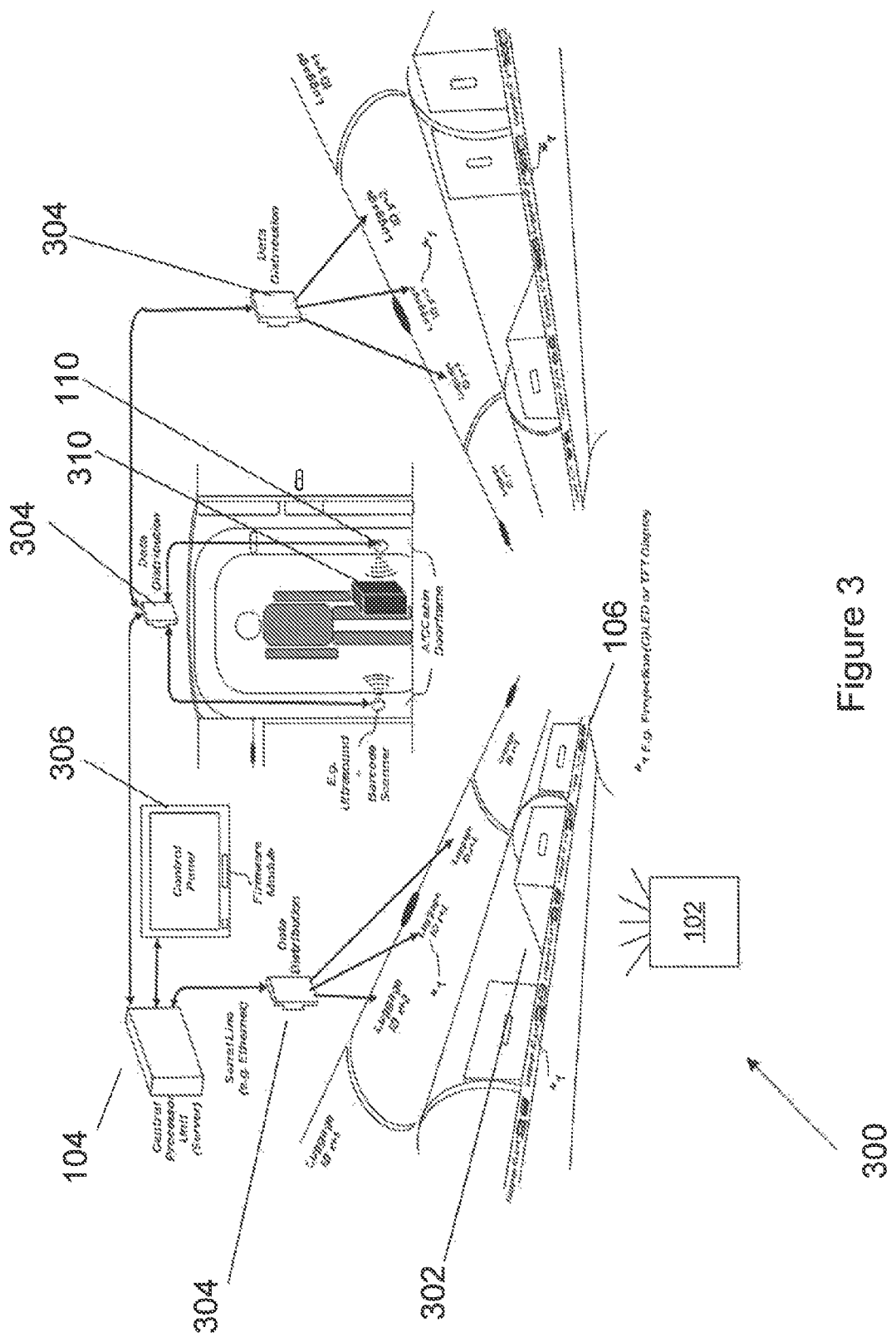
FIG. 3 shows a schematic representation of an electronic baggage stowage system according to embodiments of the present invention.

FIG. 3 shows a schematic representation of an electronic baggage stowage system 300 according to embodiments described herein.

In this example, cabin stowage space 302 in the compartments is detected and monitored using detector 102. Detector 102 is in communication with the processing unit 104 (shown as a server in this example) via a data distribution device 304a. In this example, a serial line (Ethernet) connects the data distribution device 304a with the processing unit 104.

The processing unit 104 is controlled using control panel 306 which comprises a firmware module.

In this example, the electronic baggage stowage system 300 further comprises ultrasound and barcode scanners 110 which detect the baggage size upon entry of a passenger with a baggage 310 into the aircraft cabin. The baggage size data obtained using the ultrasound and barcode scanners 110 are then provided to the processing unit 104 via the data distribution device 304b.

The processing unit 104 is configured to process the baggage size data and the cabin stowage space data in order to output baggage stowage mapping data indicating a target position at which the baggage item 310 is to be placed.

In this example, the target position is indicated by OLED and TFT displays at the corresponding, respective compartments of the cabin stowage space. In this example, red LED lights further indicate that a corresponding, respective compartment is already occupied, whereas a green LED light indicates that a compartment is empty.

In this example, luggage IDs are displayed at the open compartments, indicating the target position for a baggage item.

As outlined above, the information about free space and baggage size is available and processed on-board the aircraft. The processing and storage of the stowage space surveillance is, in some examples, performed using a Cabin Management System.

The baggage size of the baggage item of a passenger is measured in this example during the boarding process. However, as outlined above, the baggage size data may be obtained additionally or alternatively by inputting this information into the system prior to the boarding process.

In this example, the electronic baggage stowage system calculates the optimal stowage place of a baggage item, taking into account the baggage size, the available space and the seat number. The electronic baggage stowage system assigns a dedicated place to stow the piece of baggage.

In this example, the assigned stowage place is communicated and indicated to the passenger while boarding the aircraft. The information is sent to the mobile device of the passenger using, Wi-Fi or mobile phone standards.

The assigned place is, in this example, also indicated at the stowage compartment using LED displays, as outlined above. The baggage ID number is displayed at the assigned target position in order to show the passenger where the baggage item is to be placed.

In this example, the ID number of the baggage item is communicated to the passenger prior to boarding the aircraft, in this example on the boarding pass and/or the mobile device of the passenger.

Furthermore, the ideal orientation (horizontal, vertical, etc.) for stowage of the baggage item is additionally displayed, in this example, via the LED display(s).

In this example, in case a piece of baggage has been placed at the wrong position, the electronic baggage stowage system automatically computes and assigns new positions for the next pieces of baggage.

The electronic baggage stowage system indicates free space after closing the stowage compartments. This is done, in this example, by displaying the information at the compartment directly and/or at the cabin operation device (such as, e.g., the flight attendant panel).

Figure 4:
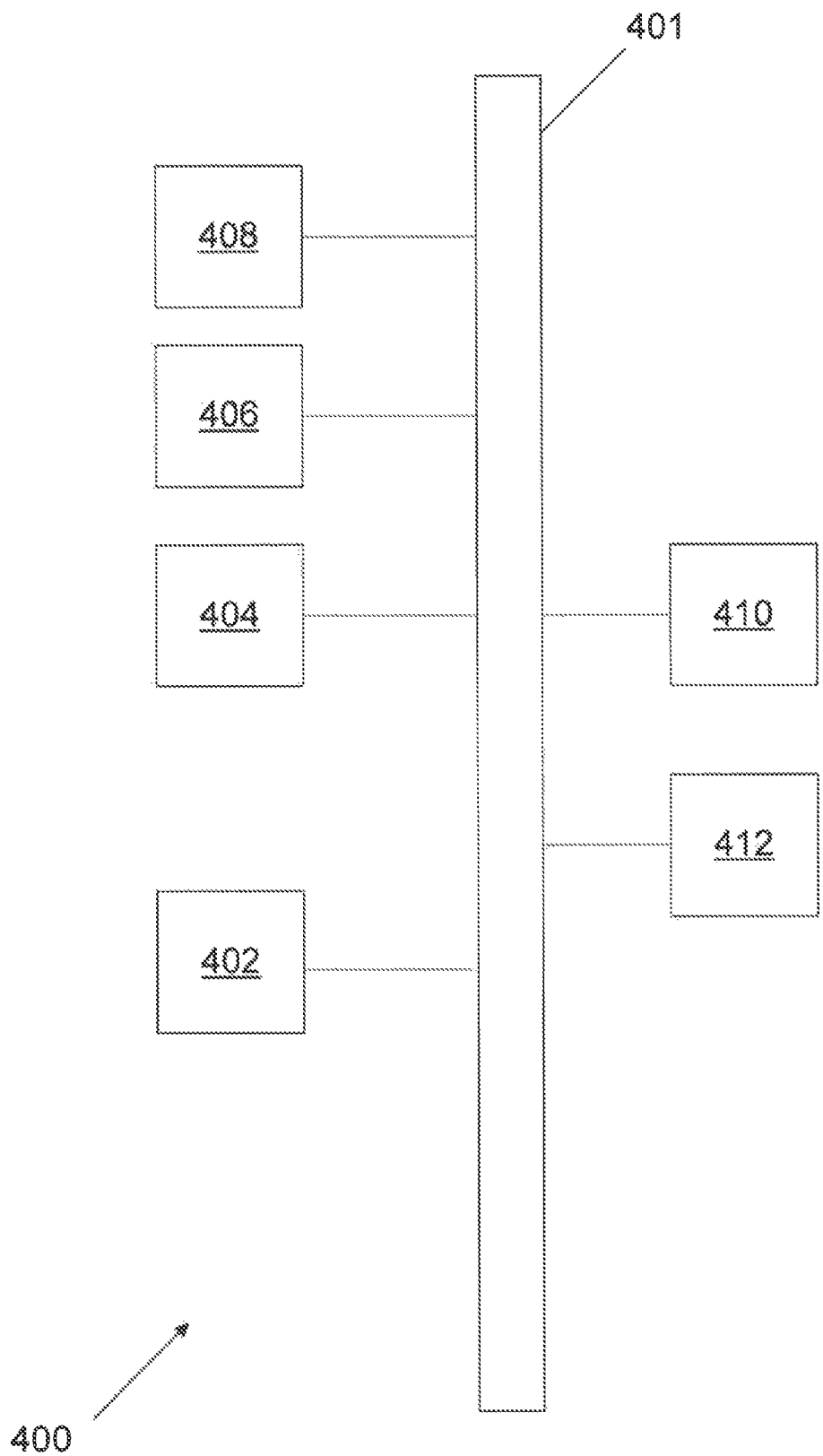
FIG. 4 shows an embodiment of a computer system programmed to control and implement the methods and systems of FIGS. 1 to 3.

FIG. 4 shows an embodiment of a computer system 400 programmed to control and implement the systems and methods of FIGS. 1 to 3. Thus, in the illustrated embodiment, the computer system 400 comprises a processor 402 coupled to working memory 404 via bus 401 and to non-volatile memory 406 storing processor control code to control the process of 402 to implement the previously described procedures. A graphical user interface 408 is provided for displaying one or more of the cabin stowage space data, the baggage size data and the baggage stowage mapping data to the user, although the skilled person will appreciate that additionally or alternatively other forms of storage/output may be employed. The computer system 400 has an input 410; this may, for example, comprise a connection over a computer network. In a similar manner, the computer system 400 has access to a data store 412, again optionally over a computer network. The optional but preferable data store 412 may be employed to store one, some or all of the parameters described with reference to FIGS. 1 to 3.

Embodiments described herein may be applicable to all kind of cabin stowage spaces, not only to overhead bins as shown in FIG. 3.

No doubt many other effective alternatives will occur to the skilled person.

It will be understood that the invention is not limited to the described embodiments and encompasses modifications apparent to those skilled in the art and lying within the spirit and scope of the claims appended hereto.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An electronic baggage stowage system for an aircraft comprising:
    a first detector for detecting free space in a cabin stowage space, wherein said first detector is configured to output cabin stowage space data based on said detection;
    a processing unit in communication with said first detector, wherein said processing unit is configured to:
    process said cabin stowage space data;
    receive and process unstowed baggage size data indicating the size of one or more unstowed baggage items; and
    output baggage stowage mapping data in response to said processing of said cabin stowage space data and said unstowed baggage size data, wherein said baggage stowage mapping data indicates one or more target positions in said cabin stowage space at which said one or more unstowed baggage items are to be placed; and
    an indicator in communication with said processing unit for providing said indication of said one or more target positions to a flight attendant or passenger of said aircraft.

2. The electronic baggage stowage system as claimed in claim 1, wherein said detection of said free space comprises detecting whether a baggage slot in said cabin stowage space is free.

3. The electronic baggage stowage system as claimed in claim 1, wherein said detection of said free space comprises measuring an available space volume in said cabin stowage space.

4. The electronic baggage stowage system as claimed in claim 1, wherein said detection of said free space comprises continuously detecting said free space.

5. The electronic baggage stowage system as claimed in claim 1, further comprising a first wireless communication link for receiving said unstowed baggage size data, wherein said first wireless communication link is in communication with said processing unit to provide said unstowed baggage size data to said processing unit.

6. An electronic baggage stowage system for an aircraft comprising:
    a first detector for detecting free space in a cabin stowage space, wherein said first detector is configured to output cabin stowage space data based on said detection;
    a processing unit in communication with said first detector, wherein said processing unit is configured to:
    process said cabin stowage space data;
    receive and process unstowed baggage size data indicating the size of one or more baggage items; and
    output baggage stowage mapping data in response to said processing of said cabin stowage space data and said unstowed baggage size data, wherein said baggage stowage mapping data indicates one or more target positions in said cabin stowage space at which said one or more unstowed baggage items are to be placed; and
    an indicator in communication with said processing unit for providing said indication of said one or more target positions to a flight attendant or passenger of said aircraft, further comprising a second detector for detecting the size of said one or more unstowed baggage items, wherein said second detector is configured to output said unstowed baggage size data, and wherein said processing unit is in communication with said second detector to process said output unstowed baggage size data received from said second detector.

7. The electronic baggage stowage system as claimed in claim 6, wherein said second detector is configured to read a tag identifying said unstowed baggage item in order to retrieve said unstowed baggage size data from said tag, in particular wherein said tag comprises one or more of:
    an RFID (radio frequency identification) tag;
    a bar code; or
    an optical image.

8. The electronic baggage stowage system as claimed in claim 6, wherein said second detector comprises an ultrasound scanner.

9. The electronic baggage stowage system as claimed in claim 1, wherein said processing unit is further configured to receive and process seating data indicating a seat number of one or more passengers of said aircraft, wherein said outputting further comprises outputting said baggage stowage mapping data in response to said processing of said seating data.

10. The electronic baggage stowage system as claimed in claim 1, wherein said indicator comprises a second wireless communication link for sending said indication of said one or more target positions to an electronic portable device of said flight attendant or passenger.

11. The electronic baggage stowage system as claimed in claim 1, wherein said indicator comprises a display or a beamer for displaying said one or more target positions at a corresponding, respective position of said cabin stowage.

12. The electronic baggage stowage system as claimed in claim 11, wherein said display comprises an OLED (organic light-emitting diode) display.

13. The electronic baggage stowage system as claimed in claim 11, wherein said display comprises an LCD (liquid crystal display).

14. The electronic baggage stowage system as claimed in claim 11, wherein said displaying of the one or more target positions is in the form of a baggage ID (identification).

15. The electronic baggage stowage system as claimed in claim 1, wherein said indication of said target position comprises indicating a target orientation in which said unstowed baggage item is to be placed in said cabin stowage space.

16. The electronic baggage stowage system as claimed in claim 1, further configured to update said one or more target positions when said unstowed baggage item has been placed in a wrong one of said target positions.

17. The electronic baggage stowage system as claimed in claim 1, wherein said indicator is further configured to provide said indication of said free space after a corresponding, respective compartment has been closed.

18. A method for providing an indication of a target position of an unstowed baggage item in a cabin stowage space of an aircraft to at least one of a flight attendant or passenger, the method comprising:
    detecting free space in said cabin stowage space and outputting cabin stowage space data based on said detection;
    receiving unstowed baggage size data indicating the size of said unstowed baggage item;
    processing said cabin stowage space data and said unstowed baggage size data;
    outputting baggage stowing mapping data in response to said processing, wherein said baggage stowage mapping data indicates a target position in said cabin stowage space at which said unstowed baggage item is to be placed; and
    providing an indication of said target position to said flight attendant and/or said passenger.

* * * * *